United States Patent [19]
Shimada

[11] Patent Number: 5,123,082
[45] Date of Patent: * Jun. 16, 1992

[54] IMAGE INFORMATION RECORDER HAVING A RESOLUTION DENSITY TRANSFORMATION DEVICE

[75] Inventor: Akira Shimada, Hitachi, Japan

[73] Assignee: Hitachi, Ltd., Tokyo, Japan

[*] Notice: The portion of the term of this patent subsequent to 04/23/08 has been disclaimed.

[21] Appl. No.: 637,204

[22] Filed: Jan. 3, 1991

Related U.S. Application Data

[63] Continuation of Ser. No. 294,677, Jan. 9, 1989, Pat. No. 5,010,497.

[30] Foreign Application Priority Data

Jan. 19, 1988 [JP] Japan ................................. 63-7630

[51] Int. Cl.⁵ .............................................. G06F 15/20
[52] U.S. Cl. ..................................... 395/102; 340/731; 382/47
[58] Field of Search ............... 364/518, 519; 340/731, 340/793; 382/47, 56; 358/455

[56] References Cited

U.S. PATENT DOCUMENTS

| | | |
|---|---|---|
| 4,259,694 | 3/1981 | Liao ................................. 358/455 |
| 4,501,016 | 2/1985 | Persoon et al. ....................... 382/22 |
| 4,760,463 | 7/1988 | Nonoyama et al. ............ 358/455 X |
| 4,797,741 | 1/1989 | Sato et al. ............................. 358/138 |
| 4,821,337 | 4/1989 | Alm ....................................... 382/58 |
| 4,829,587 | 5/1989 | Glazer et al. ......................... 382/47 |

Primary Examiner—Gary V. Harkcom
Assistant Examiner—Mark K. Zimmerman
Attorney, Agent, or Firm—Antonelli, Terry, Stout & Kraus

[57] ABSTRACT

An image information recorder, including a printer capable of continuous printing in the direction of scanning lines, for reproducing binary input data of an image of a resolution density of 400 dpi (dots per inch) in a form of a visual image of the resolution density of 600 dpi. The input data of 400 dpi is transformed into multi-value image data of 600 dpi in accordance with two-dimensional filtering, which is converted into an analog image signal. The analog image signal is smoothed by a low pass filter, and then the smoothed analog image signal is binarized by a constant threshold signal, whereby an output binary image data of 600 dpi is produced.

4 Claims, 10 Drawing Sheets

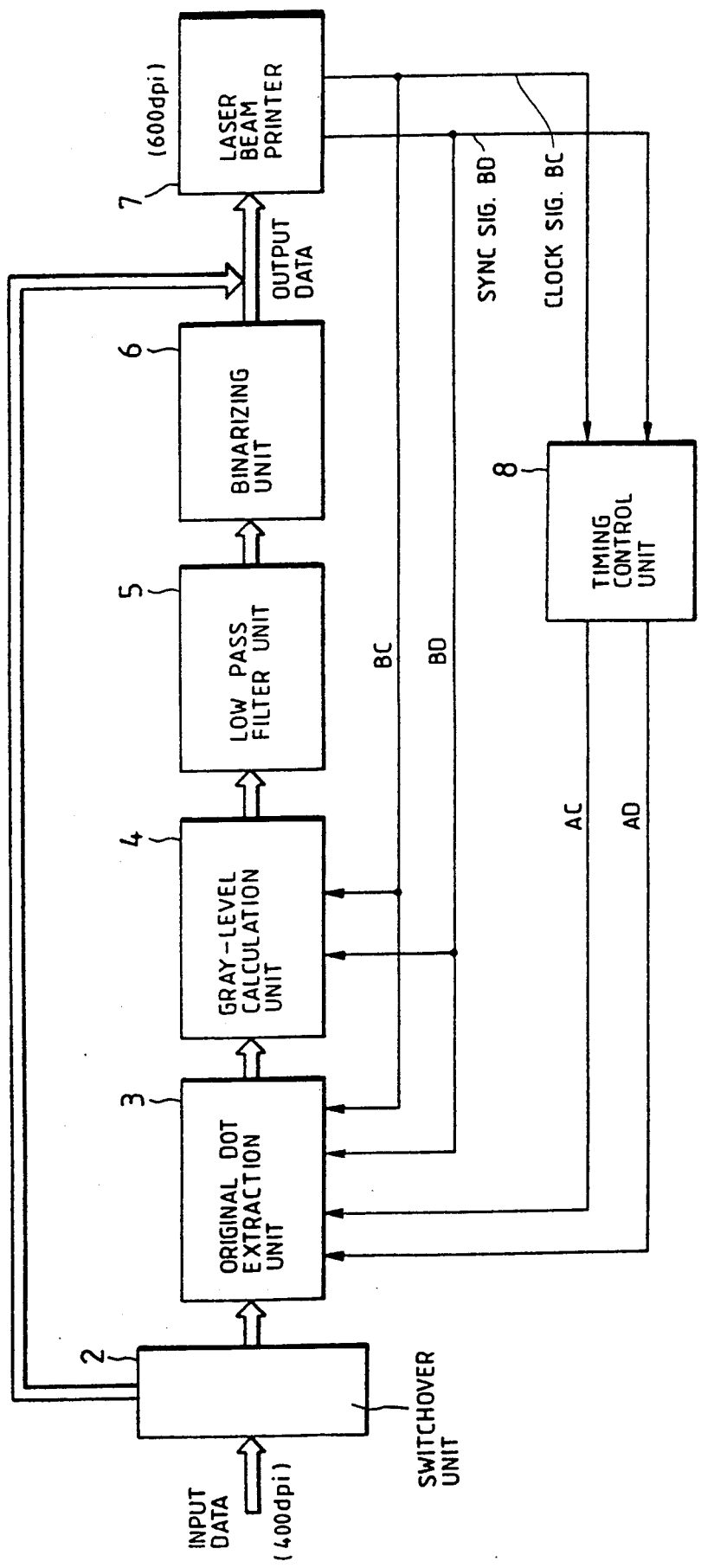

FIG. 2a
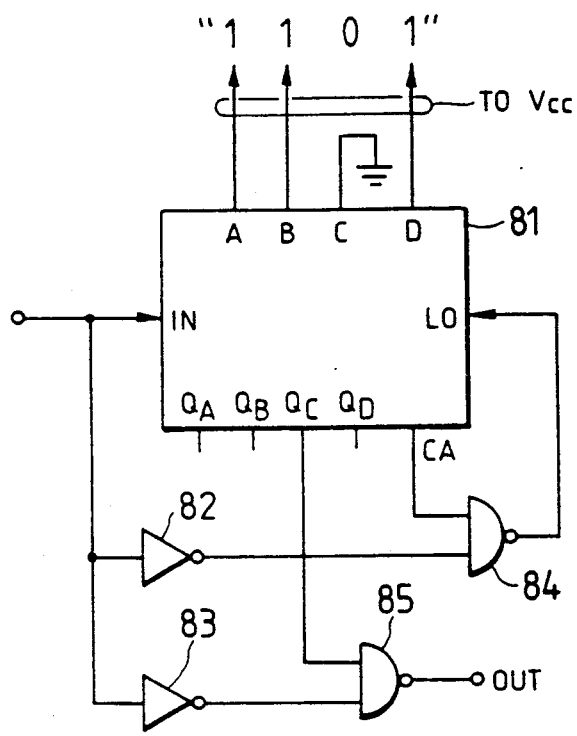
FIG. 2b  IN 
FIG. 2c  $Q_D$ 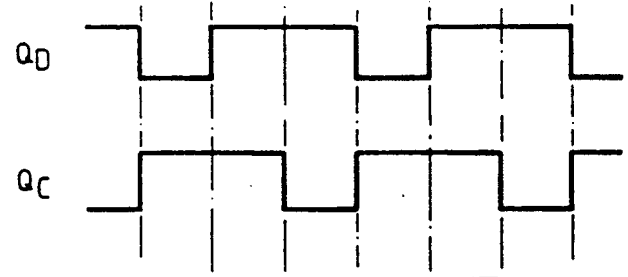
FIG. 2d  $Q_C$ 
FIG. 2e  CA 
FIG. 2f  LO 
FIG. 2g  OUT 

FIG. 8

COLUMNS IN TERMS OF 400 dpi
$b_1$ $b_2$ $b_3$ $b_4$ $b_5$ $b_6$

ROWS IN TERMS OF 400 dpi: $a_1$ $a_2$ $a_3$ $a_4$

ROWS IN TERMS OF 600 dpi: $c_1$ $c_2$ $c_3$ $c_4$ $c_5$ $c_6$ $d_1$ $d_2$ $d_3$ $d_4$ $d_5$ $d_6$ $d_7$ $d_8$ $d_9$
COLUMNS IN TERMS OF 600 dpi dpi : DOTS/INCH

FIG. 10a (ROW $a_1$)

FIG. 10d (ROW $c_1$)

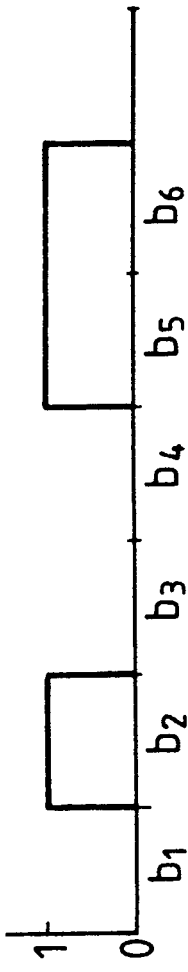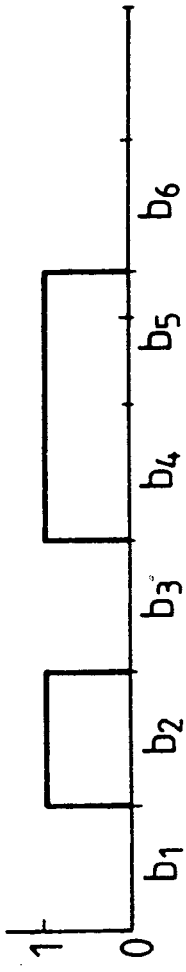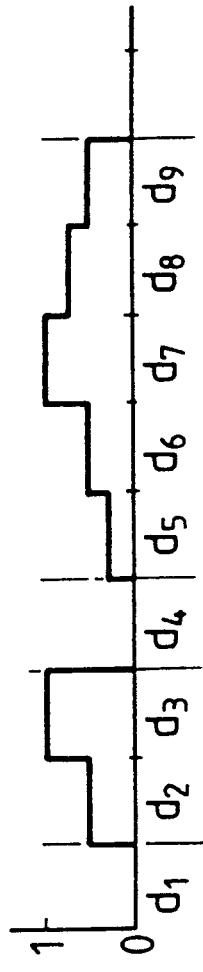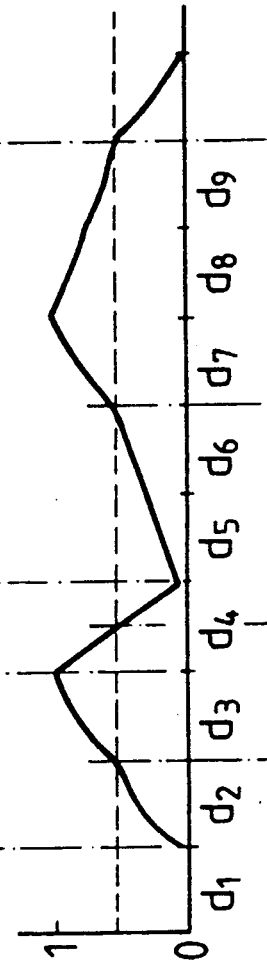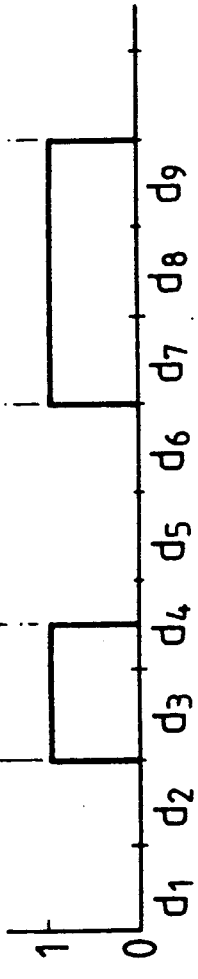
FIG. 11a (ROW $a_1$)
FIG. 11b (ROW $a_2$)
FIG. 11c
FIG. 11d
FIG. 11e (ROW $c_2$)

IMAGE INFORMATION RECORDER HAVING A RESOLUTION DENSITY TRANSFORMATION DEVICE

This is a continuation of our U.S. application Ser. No. 07/294,677, filed Jan. 9, 1989, now U.S. Pat. No. 5,010,497, issued Apr. 23, 1991.

BACKGROUND OF THE INVENTION

1. Field of the invention

The present invention relates to an image information recorder, and more particularly, to an image information recorder capable of reproducing image signals in the form of a visual image which have a resolution density different from that of the recorder.

2. Description of the related art

Signals (image signals) of image information can be reproduced in the form of a visual image by an image information recorder, such as a printer, which repeatedly carries out horizontal scanning (primary scanning) and vertical scanning (secondary scanning) in response to the image signals. The horizontal or primary one of the aforesaid scannings is usually carried out along a so called "scanning" line.

The scanning line can be considered as being formed by a great many small dots, which continuously, or at least substantially continuously, exist on a line and each have a certain information, such as black or white, called a gray level. The image signals as mentioned above are provided dot by dot in response to the gray level of the respective dots.

The distance between two adjacent scanning lines is usually made equal to the diameter of a dot, so that dots are regularly arranged in a matrix (dot matrix). Therefore, any two-dimensional image can be reproduced by the collection of dots in a dot matrix which have the respective gray level according to the image. Such collection of dots will hereinafter be called a dot pattern.

The quality, i.e., the resolution, of an image reproduced on the basis of the image signals is determined by the number of dots per unit length of a scanning line This number of dots is called a resolution density, which is usually represented by the number of dots per inch of a scanning line (abbreviated as dpi, hereinafter).

Presently, various kinds of office automation equipment, e.g., computers, facsimile machines and so on, are used which are often coupled to image information recorders. In those cases, the resolution density of image signals applied to an image information recorder must be equal to that of the recorder or else, the image information carried by image signals can not be reproduced exactly. Therefore, in the case where it is necessary to have devices having the different resolution densities are coupled with each other, transformation of resolution density is required between both devices.

For this purpose, various techniques of resolution density transformation have been developed. Briefly, resolution density transformation involves a dot pattern of a certain resolution density being transformed to a dot pattern of a different resolution density. In other words, when respective co-ordinate systems are applied to the dot matrix of original image information and that of an image information to be reproduced, the position and gray level of every dot in the co-ordinates of the image information to be transformed are determined on the basis of the position and gray level of a dot or dots in the co-ordinates of the original image information.

The gray level of every dot in the transformed co-ordinates is determined by a calculation in accordance with a predetermined algorithm on the basis of the gray level of a dot or dots on the original co-ordinates. During this calculation, there occur cases where some dots in the original co-ordinates are sometimes omitted in the transformed co-ordinates or undesired dots are sometimes added in the transformed co-ordinates, with the result that blurring or fading appears in the visual image reproduced.

The aforesaid disadvantage is caused for the following reason. The gray level of a dot in the transformed co-ordinates, as the result of the calculation in accordance with a predetermined algorithm, is of a multi-value. Such a gray level signal of the multi-value is compared with a certain threshold value to be converted into a binary signal suited for reproduction by an image information recorder.

In this case, if the value of the threshold signal is always fixed, there occurs the omission of necessary dots or the addition of undesired dots, as mentioned above, according to the figure of the dot pattern included in an original image information, e g., an oblique line, a right-angled pattern, and so on. In the case of an oblique line, for example, the edges of a reproduced line are not become smoothed, but may be indented because of the inappropriate selection of the value of a threshold signal. Also, the corner of a right-angled pattern may be rounded As one of the techniques for improving the disadvantage as mentioned above, there has been proposed a resolution density transformation technique as disclosed in the laid-open Japanese patent application JP-A-62/73865(1987).

According to this prior art technique, the value of a threshold signal is varied in accordance with the gray level distribution in an original dot pattern, which contributes to the calculation of the gray level of a dot in the transformed co-ordinates. For example, when the gray level of dots in the corner portion of a right-angled pattern is determined, a threshold signal is changed to a smaller value than usual. If, therefore, the dot pattern of an original image information is so complicated that the figure as mentioned above is included very much, the threshold value must be changed often as much.

However, variance of the value of a threshold signal so often in accordance with the gray level distribution in an original dot pattern results in complications, and such variance is not practical, especially in an image information having a complicated dot pattern.

SUMMARY OF THE INVENTION

An object of the present invention is to provide an image information recorder capable of reproducing image signals in the form of a visual image with less distortion by means of a simple resolution density transformation, even if the image signals have the resolution density different from that of the recorder.

A feature of the present invention resides in that a signal representing the calculated gray levels of dots in a density-transformed image information is converted into an analog signal and then subjected to a low pass filter, and thereafter the analog signal is binarized by using a constant threshold value.

According to a present invention, the high quality reproduction of image information can be realized by an apparatus with simple structure.

BRIEF DESCRIPTION OF THE DRAWINGS

FIG. 1 schematically shows the overall configuration of an image information recorder according to an embodiment of the present invention;

FIGS. 2a to 2g are drawings for explaining a timing control unit employed in the image information recorder of FIG. 1, in which there are shown a circuit arrangement of the unit and the waveforms of various parts thereof;

FIG. 8 is a drawing for explaining the operational principle of a two-dimensional filter included in the gray level calculation unit shown in FIG. 3; this figure will also be used to explain the principle of resolution density transformation;

FIG. 9 shows an example of the dot pattern of a part of an original image information which is utilized for explaining the operation of the image information recorder of FIG. 1;

FIGS. 10a to 10d and FIGS. 11a to 11e are drawings for explaining the operation of the image information recorder shown in FIG. 1, which show the waveforms of signals in various steps of the operation; and FIGS. 12a and 12b comparatively show the dot patterns which are transformed from the dot pattern of FIG. 9 according to the present invention and the prior art, respectively.

DESCRIPTION OF THE PREFERRED EMBODIMENT

Figure 3:
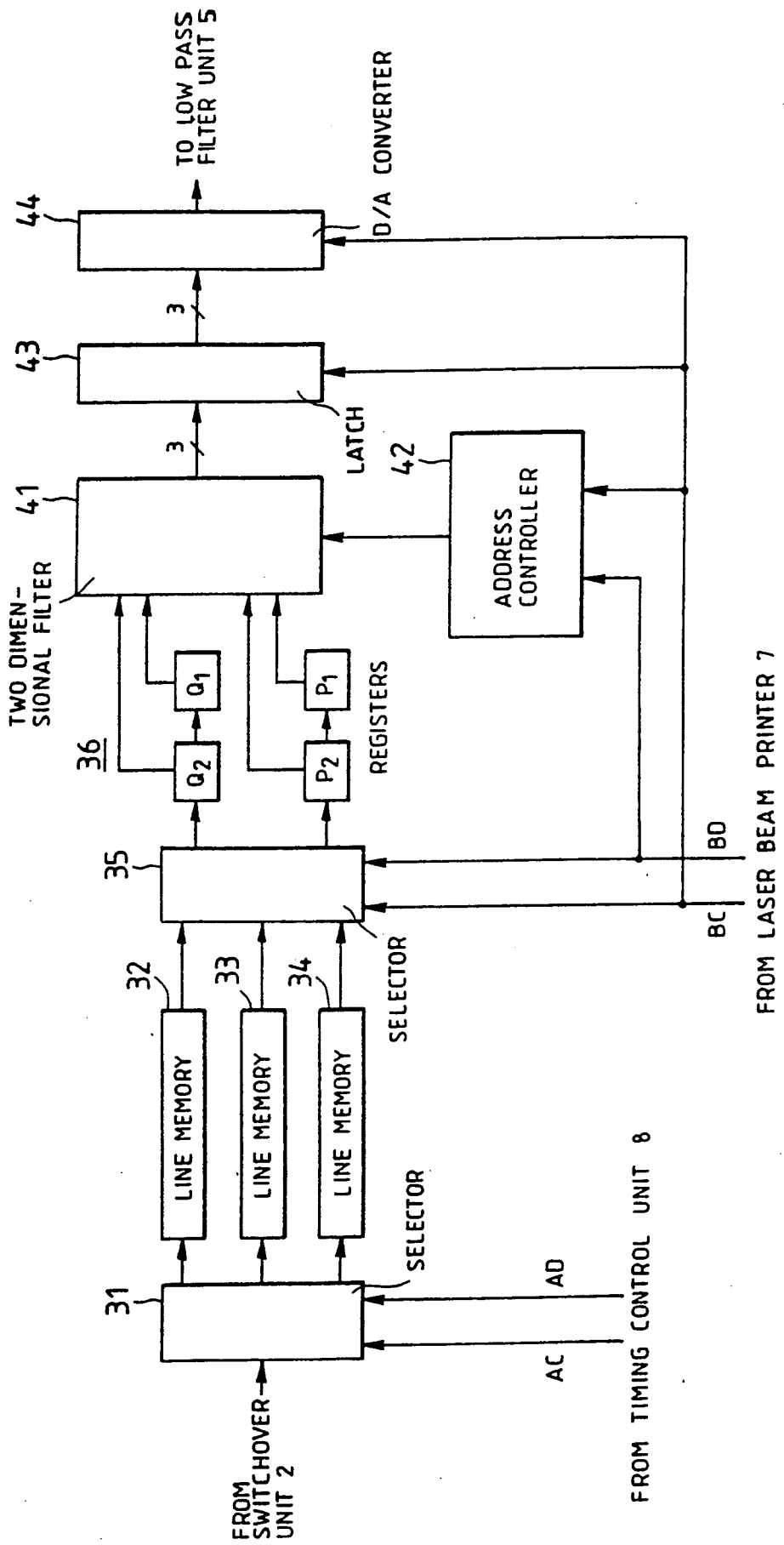
FIG. 3 schematically shows the construction of an original dot extraction unit and a gray level calculation unit employed in the image information recorder of FIG. 1.

In an embodiment described below, there is discussed as an example an image information recorder which inputs an image information data of a resolution density of 400 dpi and reproduces such data in the form of a visual image by a printer having a resolution density of 600 dpi. The image information data may be output data from an electronic data processing system or a facsimile data transmitted through a communication line.

The printer as mentioned above can be a laser beam printer usually used in an electronic data processing system or a thermal printer as used in a facsimile machine. The present invention is also applicable to printers of the type in which substantially continuous printing can be accomplished in the direction of primary scanning For convenience in the following description, before a detailed description of the embodiment, the brief explanation will be given of the resolution density transformation with reference to FIG. 8.

FIG. 8 shows a part of a dot matrix applied to obtain image information data of a two-dimensional image, in which solid lines indicate the dot matrix of original image information of a resolution density of 400 dpi and broken lines indicate the dot matrix of the image information which is subjected to resolution density transformation from 400 dpi to 600 dpi. In the original dot matrix, rows $a_1$ to $a_4$ are defined in the direction of primary scanning, and columns $b_1$ to $b_6$ are defined in direction of the secondary scanning. Similarly, in the transformed dot matrix, rows $c_1$ to $c_6$ are defined in the direction of the primary scanning, and columns $d_1$ to $d_9$ are defined in the direction of the secondary scanning.

Resolution density transformation means that a dot pattern in the original dot matrix is transformed to a dot pattern in the transformed dot matrix. Namely, the gray levels of the dots $(c_1, d_1)$, $(c_1, d_2)$, ..., $(c_6, d_8)$, $(c_6, d_9)$ in the transformed dot matrix are determined by a calculation in accordance with a certain algorithm on the basis of the gray levels of a dot or dots which are extracted from the dots $(a_1, b_1)$, $(a_1, b_2)$, ..., $(a_4, b_5)$, $(a_4, b_6)$ in the original dot matrix. The dot or dots to be extracted are also determined by the certain algorithm.

Referring now to FIG. 1, the overall configuration of the image information recorder of the embodiment will be described as follows. There is shown in the figure an example in which a laser beam printer having a resolution density of 600 dpi is used.

As shown in the figure, switchover unit 2 receives as input data an image information signal of a resolution density of 400 dpi, as already described, and outputs it to original dot extraction unit 3, or directly to laser beam printer 7, in accordance with particular circumstances. If a input data has the resolution density of 600 dpi, which is equal to that of the printer 7, the switchover unit 2 will output the data directly to the printer 7 because no resolution density transformation is required. Otherwise, the switchover unit 2 outputs the received data to the original dot extraction unit 3 for processing of the resolution density transformation.

The original dot extraction unit 3 receives the image information data from the switchover unit 2 and selects a dot or dots in the original image information on the basis of which the gray level of a dot in the transformed image information is to be calculated. The operation in the unit 3 is carried out under the control of various timing control signals, including a synchronizing signal BD for primary scanning and a clock signal BC from the printer 7, which will be described in detail later.

The gray level signals of the original dot or dots extracted in the unit 3 are coupled to gray level calculation unit 4, in which the gray level of a dot in the transformed image information is calculated in accordance with a predetermined algorithm on the basis of the gray levels of the original dot or dots selected in the unit 3. As will be described in detail later, a two-dimensional filter is utilized as the predetermined algorithm in this embodiment. The calculating operation in this unit 4 is also carried out under control of the synchronizing signal BD and the clock signal BC from the printer 7. The calculated gray level, which is of a digital multi-value, is converted into the analog signal. Further, it is to be noted that the output signal of the unit 4 is an analog signal which changes stepwise.

The analog image information signal outputted from the unit 4 is coupled to low pass filter unit 5, in which the stepwise changing analog signal is smoothed. The smoothed signal outputted from the filter 5 is compared with a threshold signal of a predetermined constant value in binarizing unit 6 so that a binary signal of the transformed image information can be obtained. The binary signal is coupled to the laser beam printer 7, in which the original image information is reproduced with the transformed resolution density.

Timing control unit 8 receives the synchronizing signal BD and the clock signal BC from the printer 7 and converts such signals into timing control signals AD and AC for controlling the original dot extraction unit 3. Further, the signals BD and BC of the printer 7 are directly applied to both the original dot extraction unit 3 and the gray level calculation unit 4.

In the following, the timing control signals AD and AC and the preparation thereof will be described, with reference to FIGS. 2a and 2g.

As already described, the transformed image information data of 600 dpi must be obtained on the basis of the original image information data of 400 dpi. In other words, data for three dots in the transformed image information have to be obtained from data for two dots in the original image information. Therefore, it is necessary to provide the timing control signals AD and AC, a frequencies of which have the ratio of 2:3 with respect to the frequencies of the synchronizing signal BD and the clock signal BC of the printer 7, respectively.

The timing control signals AD and AC having the above mentioned frequencies are generated by the timing control unit 8, which includes two sets of the circuit arrangement shown in FIG. 2a. In each set thereof, there is provided counter 81 with preset terminals A, B, C, D, which are selectively coupled to a control voltage source $V_{cc}$ to preset an initial value in the counter 81. In this case, the binary code "1101" is set, as shown in the figure. The initial value is set for every time of application of a signal to a load terminal LO as described below The counter 81 further has output terminals $Q_A$, $Q_B$, $Q_C$, $Q_D$, carry output terminal CA and input terminal IN.

There are further provided two inverters 82, 83 and two NAND gates 84, 85. Input terminals of the inverters 82, 83 are both coupled to the terminal IN of the counter 81. Two input terminals of the NAND gate 84 are coupled to the terminal CA of the counter 81 and an output terminal of the inverter 82, respectively. An output signal of the NAND gate 84 is applied to the terminal LO of the counter 81. The terminal $Q_C$ of the third significant digit of the output terminals of the counter 81 and an output terminal of the inverter 83 are coupled to two input terminals of the NAND gate 85, respectively. The output signal of the timing control unit 8 is derived from an output terminal of the NAND gate 85.

The circuit arrangement constructed as described above operates as follows. The counter 81 counts up the input signal, as shown in FIG. 2b, applied to the terminal IN. As a result, the states of the terminals $Q_C$ and $Q_D$ of the third and the least significant digits of the output terminals change as shown in FIGS. 2d and 2c, respectively, because the counter 81 repeatedly assumes three states of "1101", "1110" and "1111". Namely, the state of the counter 81 returns to "1101" from "1111" every third input signal applied to the terminal IN. Upon the state change from "1111" to "1101", the carry output signal as shown in FIG. 2e appears at the terminal CA of the counter 81.

Figure 4:
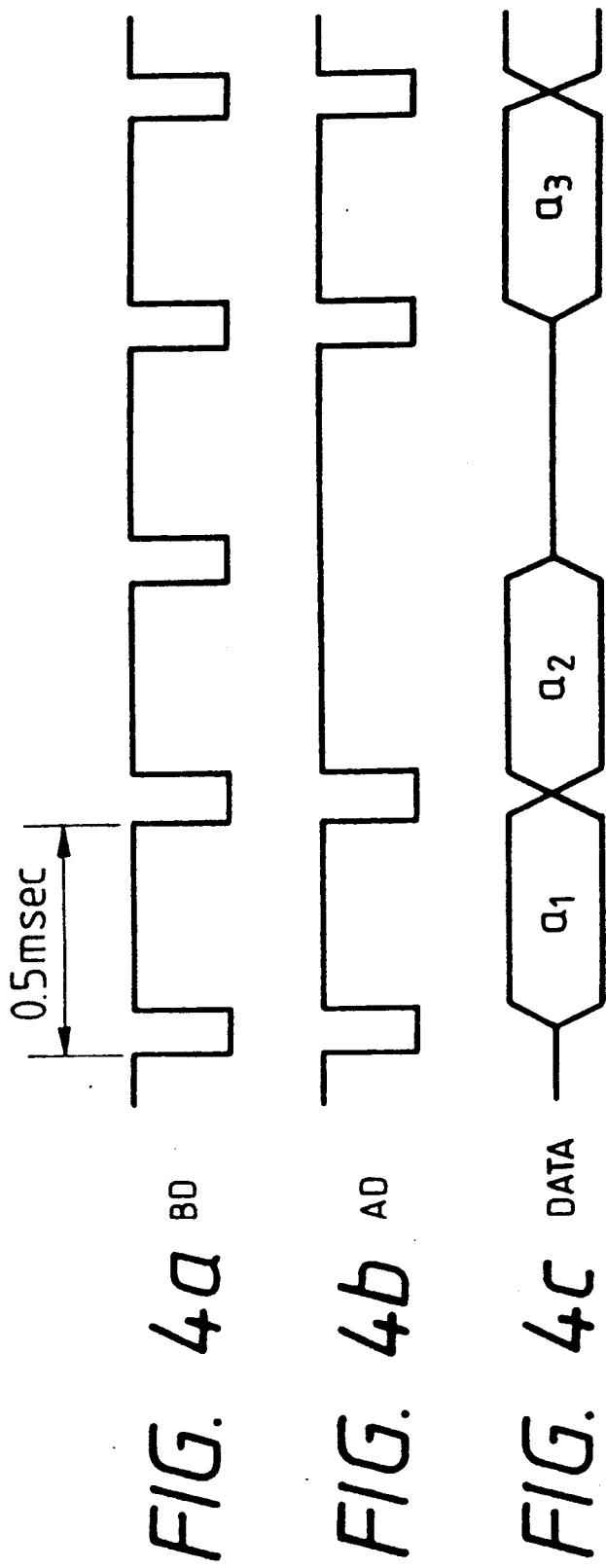
FIGS. 4a to 4c and FIGS. 5a to 5d are drawings for explaining the operation of the original dot extraction unit of FIG. 3.
Figure 5:
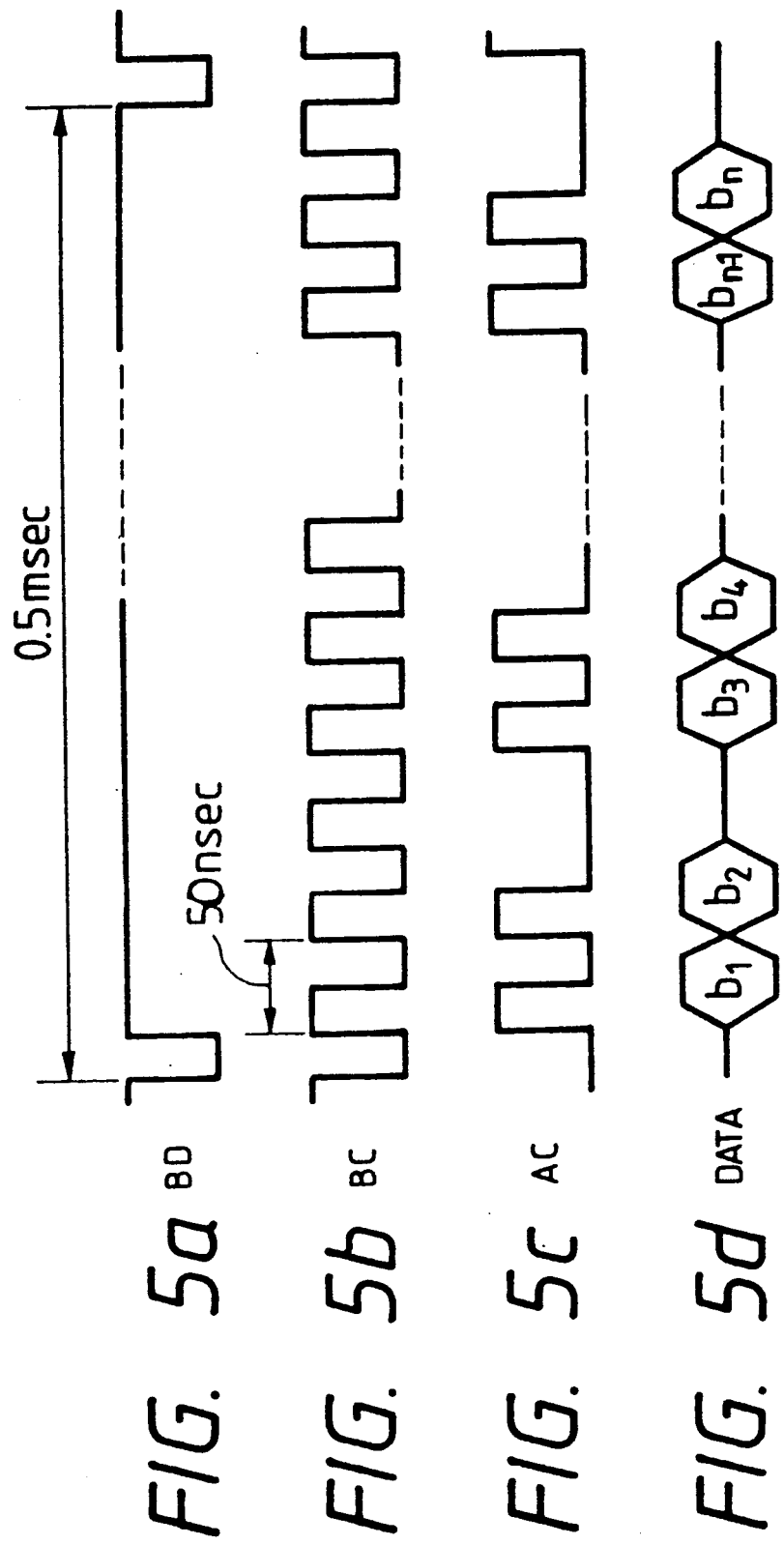

Because of occurrence of the carry output signal and the third input signal, the NAND gate 84 produces the load signal as shown in FIG. 2f, which is applied to the terminal LO of the counter 81. When the load signal occurs, the initial value of "1101" is set in the counter 81 again. As the result of the operation as mentioned above, the output signal as shown in FIG. 2g can be obtained from the NAND gate 85. As apparent from the comparison of FIGS. 2b and 2g, there can be obtained the output signal, the frequency of which has the ratio of 2:3 to that of the input signal The timing control unit 8 has two sets of the circuit as mentioned above, one of which is used to produce the timing control signal AD as shown in FIG. 4b on the basis of the synchronizing signal BD as shown in FIG. 4a, and the other of which is used to produce the timing control signal AC as shown in FIG. 5c on the basis of the clock signal BC as shown in FIG. 5b. In the case of this embodiment, since the synchronizing signal BD for the primary scanning has the repetition period of about 0.5 msec and the clock signal BC has a repetition period of about 50 nsec, the relation of the repetition period between the signals BD and BC is as shown in FIGS. 5a and 5b.

Referring next to FIGS. 3, 4a to 4c and 5a to 5d, the details of the original dot extraction unit 3 and the gray level calculation unit 4 will be explained. The original dot extraction unit 3 comprises first selector 31, three line memories 32 to 34, second selector 35 and $P_1$, $P_2$, $Q_1$, $Q_2$ registers generally denoted by reference numeral 36. The gray level calculation unit 4 comprises two-dimensional filter 41, address controller 42, latch 43 and digital to analog (D/A) converter 44.

The first selector 31 responds to the timing control signal AD as shown in FIG. 4b to input the data of the original image information sent from the switchover unit 2 into the line memories 32 to 34 successively The respective line memories 32 to 34 have the same number of bits as that of the dots in one scanning line.

As shown in FIG. 4c, therefore, the data for the row $a_1$ is stored in the line memory 32 in response to the first one of pulses of the timing control signal AD, and the data for the row $a_2$ is stored in the line memory 33 in response to the next pulse of the signal AD. The data for the row $a_3$ is stored in the line memory 34 in response to the third pulse of the signal AD. When the fourth pulse of the signal AD occurs, the data $a_1$ is put out from the line memory 32 and the data for the row $a_4$ is newly stored therein.

As described above, the contents stored in the line memories 32 to 34 are replaced successively in response to every pulse of the timing control signal AD. Further, storage of the data for one scanning line is carried out dot by dot (bit by bit) in synchronism with the timing control signal AC as shown in FIG. 5c.

The second selector 35 responds to the synchronizing signal BD for the primary scanning of the printer 7 and successively designates one of the line memories 32 to 34. Further, the selector 35 transfers the data of the designated one of the line memories 32 to 34 to the $P_1$, $P_2$ or $Q_1$, $Q_2$ registers 36 in response to the clock signal BC of the printer 7. Further, the respective one of the $P_1$, $P_2$, $Q_1$ and $Q_2$ registers 36 is composed of a one-bit register. Therefore, the transfer of data from the line memories 32 to 34 to the one-bit registers 36 is as follows.

Assuming, for example, that the rows $a_1$ and $a_2$ are designated, the gray levels of the dots $(a_1, b_1)$, $(a_1, b_2)$ and $(a_2, b_1)$, $(a_2, b_2)$ are at first stored in the $P_1$, $P_2$ and $Q_1$, $Q_2$ registers 36 in response to first two pulses of the clock signal BC, respectively. The contents of those one-bit registers change to the gray levels of the dots $(a_1, b_2)$, $(a_1, b_3)$ and $(a_2, b_2)$, $(a_2, b_3)$, when the next pulse of the clock signal BC occurs. When a fourth pulse of the clock signal BC occurs, they further change to the gray levels of the dots $(a_1, b_3)$. $(a_1, b_4)$ and $(a_2, b_3)$, $(a_2, b_4)$. In this manner, the contents of the four one-bit registers 36 are successively changed in response to the synchronizing signal BD and the clock signal BC of the printer 7.

The four one-bit registers 36 are coupled to the two dimensional filter 41. In the filter 41, the gray levels of dots in the transformed image information are calculated in accordance with a predetermined algorithm on the basis of the data stored in one or more than one of the four one-bit registers 36. Concerning the algorithm to be executed by the filter 41, a typical one of examples thereof will be described in detail later.

The two-dimensional filter 41 is constructed by a gate circuit arrangement wired so as to realize the calculation according to the predetermined algorithm or a microprocessor programmed so as to execute the predetermined algorithm. The data to be used for the calculation in the filter 41 is selected from among the contents of the four one-bit registers 36 in accordance with an address control signal supplied thereto, which is produced by address controller 42 on the basis of the synchronizing signal BD and the clock signal BC.

As is well known, an address controller of this kind is constructed by the combination of a counter for counting any input pulse, such as the synchronizing signal BD and the clock signal BC in this embodiment, and a decoder coupled thereto for decoding the content of the counter to produce control signals. The address controller 42 is provided with two sets of counters and decoders constructed as described above.

One of the counters counts the synchronizing signal BD and one of the decoders decodes the content of the one counter to produce a first control signal for designating the rows which include dots to be used for the calculation in the filter 41. The other counter counts the clock signal BC and the other decoder decodes the content of the other counter to produce a second control signal for designating the columns which include dots to be used for the calculation in the filter 41.

The address control signal produced by the address controller 42 is composed of the first and second control signals as mentioned above. As will be understood from the explanation described in detail later, the gray level calculation to be executed in the filter 41 is composed of the repetition of the same type of calculation, in which dots in the original image information used for the calculation are regularly shifted in a sequential manner. Therefore, the aforesaid decoders can be easily constructed by gate circuits wired in accordance with the algorithm of the gray level calculation to be executed in the filter 41.

Further, it is to be noted that, as will be apparent later, the gray level signals of dots in the transformed image information as the result of the above mentioned calculation are signals which take one of the multi-values, e.g., four values in this embodiment, although the data stored in the respective registers 36 is the binary data. Therefore, three bits are necessary for an output signal of the two-dimensional filter 41, whereby the four values of the signal level can be represented.

The gray level signal calculated by the filter 41 is latched by the latch 43 in response to the clock signal BC. Then, the latched data is transferred to the D/A converter 44 in synchronism with the clock signal BC and converted into the analog signal therein. The converted analog signal as the output of the gray level calculation unit 4 is coupled to the low pass filter unit 5.

The analog signal supplied from the gray level calculation unit 4 is smoothed by the low pass filter unit 5. In this respect, the following should be noted. The analog signal produced by the unit 4 is such that the signal level changes only at the boundary of two adjacent dots namely the analog signal from the unit 4 changes stepwise with respect to dots along a scanning line. On the contrary, the analog signal smoothed by the unit 5 changes continuously with respect to dots along a scanning line. This means that the boundaries between adjacent dots are removed in the gray level signal for one scanning line.

Figure 6:
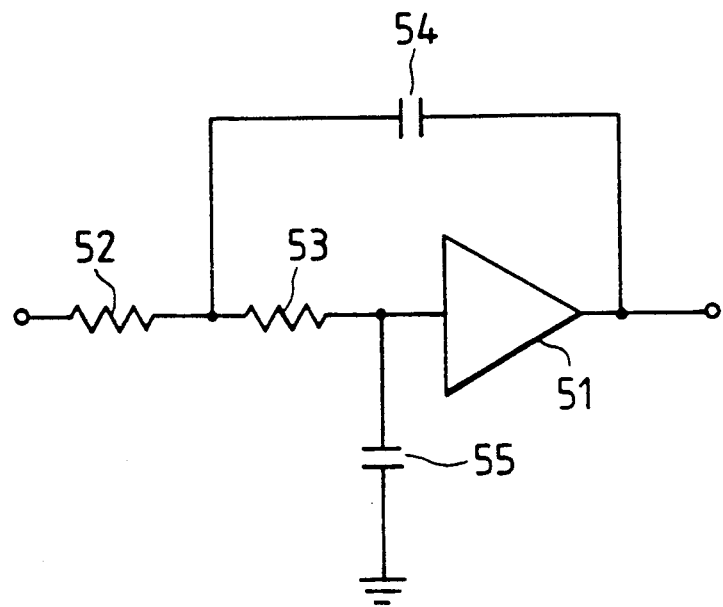
FIG. 6 schematically shows an example of a circuit arrangement of a low pass filter employed in the image information recorder of FIG. 1.

As the low pass filter unit 5, there can be employed a known circuit arrangement, an example of which is shown in FIG. 6. It comprises amplifier 51, resistors 52, 53 and capacitors 54, 55. The analog signal from the gray level calculation unit 4 is applied to one end of the resistor 52, and the smoothed analog signal can be derived from an output terminal of the amplifier 51. The time constant, which is determined by the resistor 52 and the capacitor 54, can be selected arbitrarily, but preferably is set at the value equal to the repetition period of the pulses of the clock signal BC. Since the low pass filter constructed as shown in the figure is already known, further explanation will be omitted here The analog signal smoothed by the unit 5 is coupled to the binarizing unit 6 and compared therein with a threshold signal of a predetermined constant value, whereby the smoothed analog signal can be converted by the unit 6 into a binary signal suited for the printer 7. The gray level of the binary signal obtained by the unit 6 does not always change accurately at the front edge of corresponding dots. For example, the gray level of a certain dot does not change from the front edge of the dot, but may first change at the center portion of the dot. However, even if the gray level changes at the center portion of a dot, no problem occurs since the printer 7 can carry out substantially continuous printing in the direction of the scanning line.

The aforesaid phenomenon is caused by the nature of the smoothed analog signal as described above. Further, the amount of difference between the front edge of a dot and a point at which the gray level of the dot first changes depends on the value of the threshold signal. This, however, occurs equally over the whole area of the original image information. Therefore, distortion is never caused in the image information reproduced after the resolution density transformation. Further, if necessary, the aforesaid difference amount can be easily compensated to be removed by a constant amount depending on the time constant of the low pass filter unit 5 and the value of a threshold signal in the binarizing unit 6.

Figure 7:
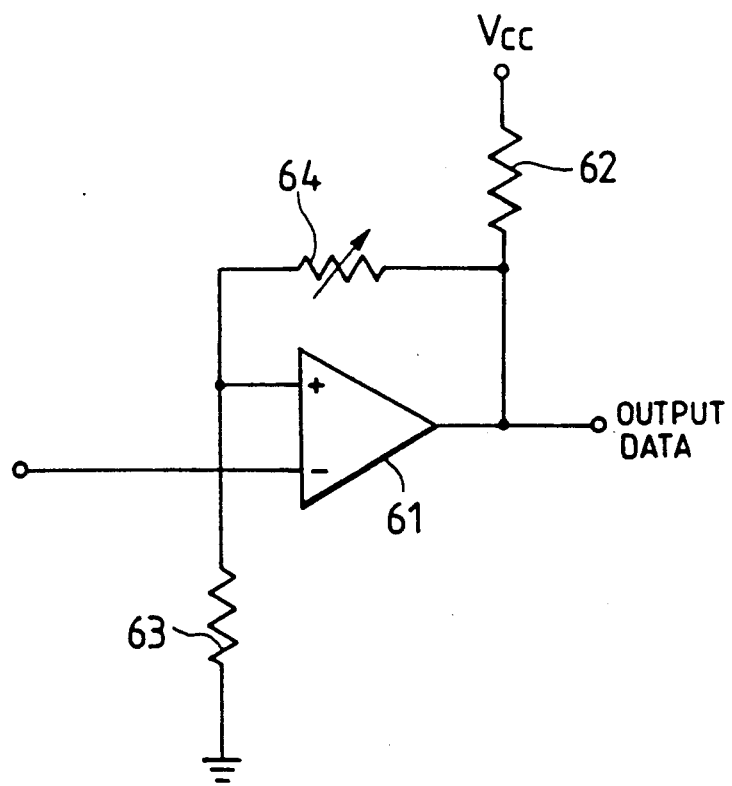
FIG. 7 schematically shows an example of a circuit arrangement of a binarizing unit employed in the image information recorder of FIG. 1.

Typical of examples of the circuit arrangement of the binarizing unit 6 is the one shown in FIG. 7. It comprises amplifier 61, constant resistors 62, 63 and variable resistor 64. The value of the threshold signal can be determined by the resistance ratio of the constant resistor 63 and the variable resistor 64. The smoothed analog signal from the low pass filter unit 5 is applied to one (−) of the input terminals of the amplifier 61, and the binarized signal can be obtained from an output terminal thereof. Although various circuit arrangements for the binarizing unit are also known, the further description thereof will be omitted here.

In the following, the description will be made of an example of the algorithm for the gray level calculation.

Although the various algorithms for that purpose are known already known, the two-dimensional filter is used in this embodiment.

In FIG. 8, as already described, the solid lines define the dots in terms of 400 dpi of the original image information, and the broken lines define the dots in terms of 600 dpi of the transformed image information. For the convenience of the following description, the former dots will be called the original dots and the latter ones the transformed dots. In the resolution density transformation, the gray level of a transformed dot is determined on the basis of the calculation using the gray levels of one or some of the original dots.

Attention is first called to the transformed row $c_1$. It can be seen in the figure that the gray level of the transformed dot $(c_1, d_1)$ can be determined on the basis of that of the original dot $(a_1, b_1)$ only. Since, however, the transformed dot $(c_1, d_2)$ extends to the two original dots $(a_1, b_1)$ and $(a_1, b_2)$, the gray levels of the two original dots are necessary to be taken into consideration in order to determine that of the transformed dot. The gray level of the transformed dot $(c_1, d_2)$ can be determined, for example, by the average of the gray levels of the two original dots $(a_1, b_1)$ and $(a_1, b_2)$. Concerning the transformed dot $(c_1, d_3)$, the gray level thereof can be determined again on the basis of that of only one original dot, i.e., the dot $(a_1, b_2)$.

As seen in FIG. 8, in the transformed row $c_1$, the same relation of the arrangement of the transformed dots to that of the original dots, as mentioned above, appears repeatedly and regularly every three transformed dots. Therefore, the gray levels of the dots in the row $c_1$ can be calculated by a set of the following formulas, in which the gray level of a dot $(a_i, b_j)$ or $(c_i, d_j)$ is indicated by $G(a_i, b_j)$ or $G(c_i, d_j)$.

$$\left. \begin{array}{l} G(c_1, d_{3k-2}) = G(a_1, b_{2k-1}) \\ G(c_1, d_{3k-1}) = \frac{1}{2}\{G(a_1, b_{2k-1}) + G(a_1, b_{2k})\} \\ G(c_1, d_{3k}) = G(a_1, b_{2k}) \end{array} \right\} \quad (1)$$

In the above formulas, k assumes 1, 2, ..., n, where n is the number of dots per scanning line.

Also in the transformed rows $c_3$, $c_4$, $c_6$, as seen in the figure, the gray level of transformed dots can be determined in the similar manner to the above. In the following, the formulas concerning the transformed row $c_3$ will be exampled.

$$\left. \begin{array}{l} G(c_3, d_{3k-2}) = G(a_2, b_{2k-1}) \\ G(c_3, d_{3k-1}) = \frac{1}{2}\{G(a_2, b_{2k-1}) + G(a_2, b_{2k})\} \\ G(c_3, d_{3k}) = G(a_2, b_{2k}) \end{array} \right\} \quad (2)$$

As apparent from the comparison of the formulas (1) and (2), there is only a difference in the original rows to be used in the gray level calculation for the transformed rows. Namely, the calculation of the formula (1) for the dots in the transformed row $c_1$ is carried out on the basis of the gray levels of the dots in the original row $a_1$, whereas the calculation of the formula (2) for the dots in the transformed row $c_3$ is carried out on the basis of the gray levels of the dots in the original row $a_2$.

In the following description, therefore, the gray level calculation of this type will be identified by the formula (1) only. Further, it will be understood that what one of the original rows is to be used in the calculation for a transformed row is automatically determined, only if the the ratio, such as 2:3 in this embodiment, of the resolution density transformation is known.

The calculation for the transformed rows $c_2$ and $c_5$ is different from that for the aforesaid transformed rows, because, as apparent in FIG. 8, the transformed rows $c_2$, $c_5$ extend over the two adjacent original rows, i.e., the rows $a_1$ and $a_2$, and the rows $a_3$ and $a_4$, respectively.

Assuming, for example, that the transformed row $c_2$ is noted, the gray level of the transformed dot $(c_2, d_1)$ can be determined as the average value of the gray levels of the two original dots $(a_1, b_1)$ and $(a_2, b_1)$. The gray level of the transformed dot $(c_2, d_2)$ can be obtained by taking the average value of the four original dots $(a_1, b_1)$, $(a_1, b_2)$, $(a_2, b_1)$ and $(a_2, b_2)$. Further, the gray level of the transformed dot $(c_2, d_3)$ can be obtained again as the average value of the two original dots, i.e., the dots $(a_1, b_2)$ and $(a_2, b_2)$.

As seen in FIG. 8, in the transformed row $c_2$, the same relation of the arrangement of the transformed dots to that of the original dots appears repeatedly and regularly every three transformed dots. Therefore, the gray levels of the dots in the row $c_2$ can be calculated by a set of the following formulas.

$$\left. \begin{array}{l} G(c_2, d_{3k-2}) = \frac{1}{2}\{G(a_1, b_{2k-1}) + G(a_2, b_{2k-1})\} \\ G(c_2, d_{3k-1}) = \frac{1}{4}\{G(a_1, b_{2k-1}) + G(a_1, b_{2k}) + \\ \qquad\qquad\qquad G(a_2, b_{2k-1}) + G(a_2, b_{2k})\} \\ G(c_2, d_{3k}) = \frac{1}{2}\{G(a_1, b_{2k}) + G(a_2, b_{2k})\} \end{array} \right\} \quad (3)$$

In the similar manner, the calculation for the transformed row $c_5$ can be carried out, as follows.

$$\left. \begin{array}{l} G(c_5, d_{3k-2}) = \frac{1}{2}\{G(a_3, b_{2k-1}) + G(a_4, b_{2k-1})\} \\ G(c_5, d_{3k-1}) = \frac{1}{4}\{G(a_3, b_{2k-1}) + G(a_3, b_{2k}) + \\ \qquad\qquad\qquad G(a_4, b_{2k-1}) + G(a_4, b_{2k})\} \\ G(c_5, d_{3k}) = \frac{1}{2}\{G(a_3, b_{2k}) + G(a_4, b_{2k})\} \end{array} \right\} \quad (4)$$

As apparent from the comparison of the above formulas (3) and (4), there is only a difference in the original rows to be used in the gray level calculation for the transformed rows. Namely, the calculation of the formula (3) for the dots in the transformed row $c_2$ is carried out on the basis of the gray levels of the dots in the original rows $a_1$ and $a_2$, whereas the calculation of the formula (4) for the dots in the transformed row $c_5$ is carried out on the basis of the gray levels of the dots in the original rows $a_3$ and $a_4$.

In the following description, therefore, the gray level calculation of this type will be identified by the formula (3) only. Further, in the similar manner to the description concerning the gray level calculation for the rows $c_1$, $c_3$, $c_4$ and $c_6$, it will be understood that what ones of the original rows are to be used in the calculation for the rows $c_2$ and $c_5$ is automatically determined, only if the ratio, i.e., 2:3 in this embodiment, of the resolution density transformation is known.

Further, as apparent from FIG. 8, the same relation between the arrangement of the original dots and that of the transformed dots appears repeatedly and regularly. Therefore, what one of the three formulas in the formula (1) or (3) should be used is determined by only counting pulses of the clock signal BC. In the similar manner, which one of the set of the formula (1) and the set of the formula (3) should be used can be determined by only counting pulses of the synchronizing signal BD.

In the following, there will be explained the operation of the image information recorder as shown in FIG. 1. For this purpose, there is taken into consideration an example of an original image information of the resolution density of 400 dpi. The dot pattern of a part of the image information is shown in FIG. 9.

Figures 10B, 10C:
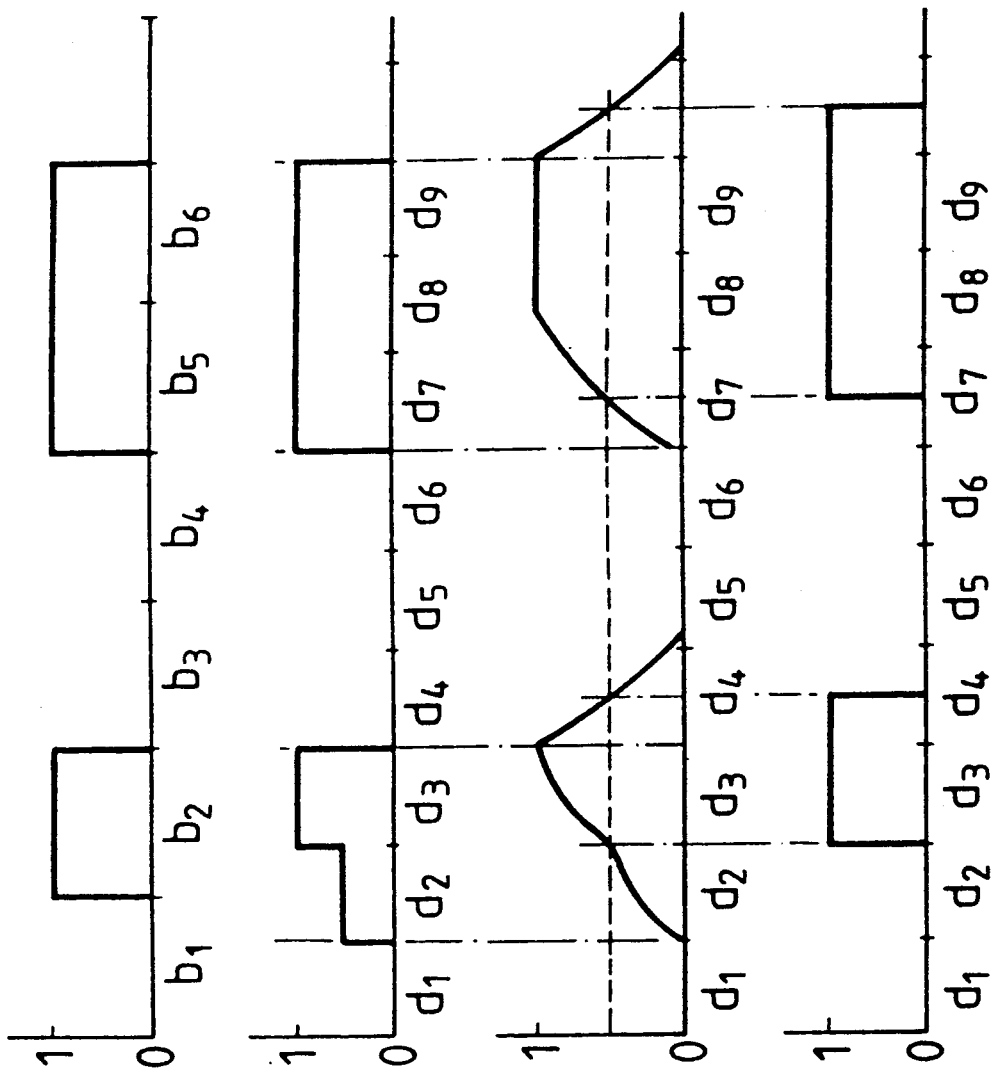

In FIG. 9, hatched portions indicate black dots in the original image information and non-hatched portions indicate white dots therein. If a black dot is represented by a binary signal of level "1" and a white dot by that of level "0", the image signal for the row $a_1$ in the dot pattern shown has the profile as shown in FIG. 10$a$ with respect to the columns $b_1$ to $b_6$. This also corresponds to the content of one of the line memories 32 to 34 in the original dot extraction unit 3.

The original dot extraction unit 3 selects the dots, which are necessary for the calculation of a transformed dot. The gray level calculation unit 4 calculates the gray level of the transformed dot in accordance with the formula (1) on the basis of the gray levels of the original dots selected in the unit 3. The calculation result is subjected to the D/A conversion and the analog signal as shown in FIG. 10$b$ is produced by the gray level calculation unit 4.

The output signal of the unit 4 is smoothed by the low pass filter unit 5 and changed to the signal as shown in FIG. 10$c$. The smoothed signal is compared in the binarizing unit 6 with the threshold signal as shown by a broken line in FIG. 10$c$, with the result that the binary signal as shown in FIG. 10$d$ can be obtained.

Referring next to FIGS. 11$a$ to 11$e$, the calculation concerning the transformed row $c_2$ will be explained. For the calculation for the row $c_2$, the two original rows $a_1$ and $a_2$ as shown in FIGS. 11$a$ and 11$b$ are necessary to be taken into consideration. The original dot extraction unit 3 selects original dots necessary for the calculation of every dot of the row $c_2$ from these two rows $a_1$ and $a_2$.

The gray level calculation unit 4 calculates the gray level of the transformed dot in accordance with the formula (3) on the basis of the gray levels of the selected original dots. The calculation result is converted into the analog signal, as shown in FIG. 11$c$. The analog signal is smoothed by the low pass filter unit 5 to be changed as shown in FIG. 11$d$. Then, the smoothed signal is binarized in the binarizing unit 6 by being compared with the threshold signal as shown by a broken line in FIG. 11$d$, so that the binary signal as shown in FIG. 11$e$ can be obtained.

Figures 12A, 12B:
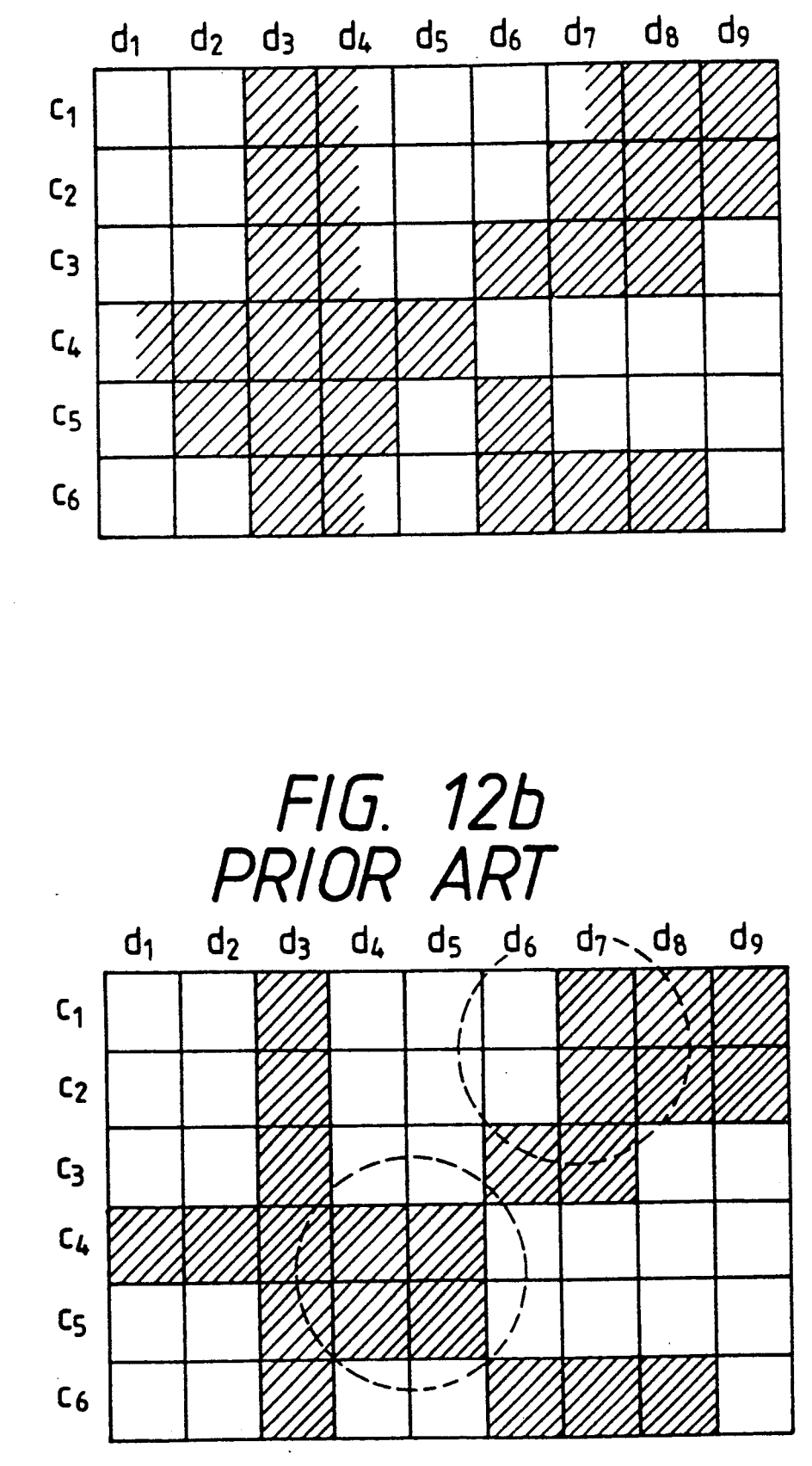

If the calculating operation as mentioned above is completed with respect to all the rows, the image information of 400 dpi can be transformed into the image information of 600 dpi. There is shown in FIG. 12$a$ the result of the resolution density transformation of the dot pattern as shown in FIG. 9 from 400 dpi to 600 dpi. For the purpose of the comparison, there is shown in FIG. 12$b$ the result of the resolution density transformation from 400 dpi to 600 dpi according to the prior art described in the description of the related art.

In the prior art resolution density transformation, there can be seen the occurrence of distortion in the portions shown by broken circles in FIG. 12$b$, though such complicated processing such that the value of a threshold signal is varied in accordance with the distribution of the dot pattern is carried out. On the other hand, according to the resolution density transformation of the present invention, considerably excellent reproduction of the original image information can be realized without the complicated variation of the threshold as in the prior art.

I claim:

1. An image information recorder comprising:
   printer means, capable of substantially continuous printing in a scanning line direction, for reproducing discrete binary input data of an image having a first resolution density supplied to said printer means as data of a visual image having a second resolution density in accordance with the discrete binary input data, said discrete binary input data corresponding to a first line of pixels having the first resolution density and changing in state only at pixel borders within the first line;
   resolution density transformation means for transforming the discrete binary input data having the first resolution density to discrete multi-value image data having the second resolution density in accordance with a predetermined algorithm and converting the discrete multi-value image data into analog form to produce a continuous analog image signal, said discrete multi-value image data corresponding to a second line of pixels having the second resolution density and changing in state only at pixel borders within the second line, and said continuous analog signal corresponding to the second line of pixels and changing in state at positions other than the pixel borders of the second line;
   low pass filter means for smoothing the continuous analog image signal produced by said resolution density transformation means; and
   binarizing means for comparing the continuous analog image signal smoothed by said low pass filter means with a threshold value having a predetermined constant value to produce continuous binary image information data to be supplied to said printer means, said continuous binary image information data corresponding to said second line of pixels and changing in state at positions other than the pixel borders of the second line.

2. An image information recorder according to claim 1, further comprising switchover means for supplying the discrete binary input data to said printer means if a user determines that the first and the second resolution densities are equal to each other, and for supplying the discrete binary input data to said resolution density transformation means if a user determines that the first and the second resolution densities are different from each other.

3. An image information recorder comprising:
   printer means, capable of substantially continuous printing in a scanning line direction, for reproducing discrete binary input data of an image having a first resolution density supplied to said printer means as data of a visual image having a second resolution density in accordance with the discrete binary input data, said discrete binary input data corresponding to a first line of pixels having the first resolution density and changing in state only at pixel borders within the first line;
   original dot extraction means for receiving therein the discrete binary input data in response to a predetermined timing control signal generated on the basis of a synchronizing signal used for scanning and a clock signal from said printer means and for selecting dots from the discrete binary input data which contribute to a gray level calculation of a dot in the image to be reproduced in response to the synchronizing signal used for scanning and the clock signal;

gray level calculation means, responsive to the synchronizing signal and the clock signal, for carrying out the gray level calculation in accordance with a predetermined algorithm based on gray levels of the dots selected by said original dot extraction means and for converting a result of the gray level calculation into analog form to produce a continuous analog image signal, said continuous analog image signal corresponding to a second line of pixels and changing in state at positions other than the pixels borders of the second line;

low pass filter means for smoothing the continuous analog image signal produced by said gray level calculation means; and binarizing means for comparing the continuous analog image signal smoothed by said low pass filter means with a threshold signal of a predetermined constant value to produce continuous binary input data to be supplied to said printer means, said continuous binary input data corresponding to said second line and changing in state at positions other than the pixel borders of the second line.

4. An image information recorder according to claim 3, further comprising timing control means for producing the timing control signal by changing a frequency of the synchronizing signal or the clock signal in accordance with a ratio of the first and the second resolution densities.

* * * * *